(12) United States Patent
Wang et al.

(10) Patent No.: US 7,708,243 B2
(45) Date of Patent: May 4, 2010

(54) HEIGHT-ADJUSTABLE STAND

(75) Inventors: Jin-Xin Wang, Shenzhen (CN); Jian Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/248,624

(22) Filed: Oct. 9, 2008

(65) Prior Publication Data

US 2010/0001147 A1  Jan. 7, 2010

(30) Foreign Application Priority Data

Jul. 1, 2008  (CN) ........................ 2008 1 0302472

(51) Int. Cl.
*F16M 11/00* (2006.01)

(52) U.S. Cl. .................... 248/157; 248/149; 248/162.1; 248/404; 248/917; 361/679.21

(58) Field of Classification Search ................. 248/157, 248/371, 917, 919, 920, 921, 922, 161, 149, 248/150, 404, 412, 414, 162.1; 361/679.05, 361/679.08, 679.21, 679.61
See application file for complete search history.

(56) References Cited

U.S. PATENT DOCUMENTS

| 6,695,274 B1 * | 2/2004 | Chiu ........................... 248/371 |
| 6,796,537 B1 * | 9/2004 | Lin ........................... 248/162.1 |
| 7,036,787 B1 * | 5/2006 | Lin ............................. 248/676 |
| 7,061,753 B2 * | 6/2006 | Michoux et al. ....... 361/679.05 |
| 7,424,991 B2 * | 9/2008 | Kim et al. ................. 248/125.9 |
| 7,628,361 B2 * | 12/2009 | Gan et al. .................... 248/132 |
| 2006/0219849 A1 * | 10/2006 | Chiu ......................... 248/125.8 |
| 2007/0195495 A1 * | 8/2007 | Kim et al. .................... 361/681 |

* cited by examiner

*Primary Examiner*—Anita M King
(74) *Attorney, Agent, or Firm*—Clifford O. Chi

(57) ABSTRACT

A stand includes a frame, a sliding member, and two torsion springs. The frame has two guide rail subassemblies. The sliding member is slidably attached to the guide rail subassemblies. A first end of each torsion spring is connected to the frame, and a second end of each torsion spring is connected to the sliding member to provide an elastic force to overcome the total weight of the sliding member and a load.

16 Claims, 4 Drawing Sheets

HEIGHT-ADJUSTABLE STAND

BACKGROUND

1. Technical Field

The present invention relates generally to stands for display devices, more particularly to a height-adjustable stand for supporting a display device.

2. Description of Related Art

Presently, flat-panel display devices such as liquid crystal display (LCD) devices are widely used due to excellent display quality and thin bodies. Typically, a function of adjusting a height of the flat display device can be realized via an adjustable stand.

Referring to FIG. 4, a typical stand 100 for an LCD device includes a first stand unit 10, a second stand unit 20, a coiled spring 30, and a shaft 31. The second stand unit 20 is movably sleeved into the first stand unit 10. The second stand unit 20 has a connecting portion 21 for connecting to an LCD panel of the LCD device. The shaft 31 is fixed to the first stand unit 10. An end of the coiled spring 30 is sleeved on the shaft 31, and the other end of the coiled spring 30 is fixed to a bottom side of the second stand unit 20.

In use, the second stand unit 20 can be driven to slide in the first stand unit 10 by an external force. When the external force is removed, the LCD panel connected to the second stand unit 20 can be positioned at a desired position, because a net weight of the LCD panel and the second stand unit 20 is equal to an elastic force produced by the coiled spring 30 and a friction force between the second stand unit 20 and the first stand unit 10.

However, the coiled spring 30 of the stand 100 does not maintain its elasticity after being cycled up and down many times. Therefore, the coiled spring 30 cannot produce a sufficient elastic force to overcome the net weight of the LCD panel and the second stand unit 20. Accordingly, the stand 100 has a short service life.

Therefore, a stand for a display device to solve the aforementioned problems is desired.

SUMMARY

An exemplary stand includes a frame, a sliding member, and two torsion springs. The frame has two guide rail subassemblies. The sliding member is slidably attached to the guide rail subassemblies. A first end of each torsion spring is connected to the frame, and a second end of each torsion spring opposite to the first end is connected to the sliding member to provide an elastic force to overcome the total weight of the sliding member and a load.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present stand for a display device. Moreover, in the drawings, like reference numerals designate corresponding parts throughout the several views.

DETAILED DESCRIPTION OF THE EMBODIMENTS

Figure 1:
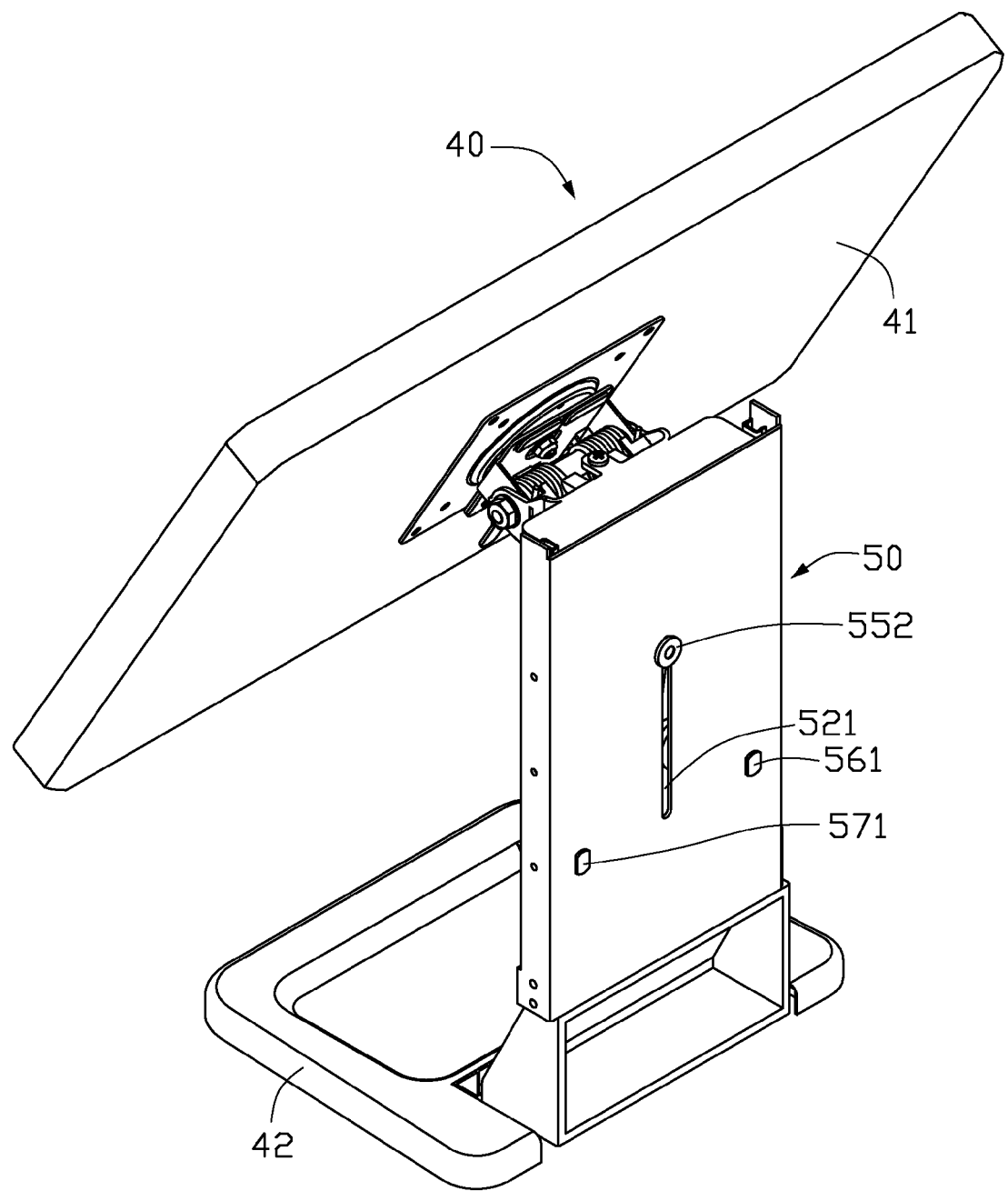
FIG. 1 is an isometric view of an embodiment of an LCD device, the LCD device including an LCD panel, a base, and a stand.

A stand according to an embodiment of the present disclosure is adapted for use in a display device such as an LCD device. Referring to FIG. 1, the LCD device 40 includes an LCD panel 41, a base 42, and a stand 50 for connecting the LCD panel 41 to the base 42.

Figure 2:
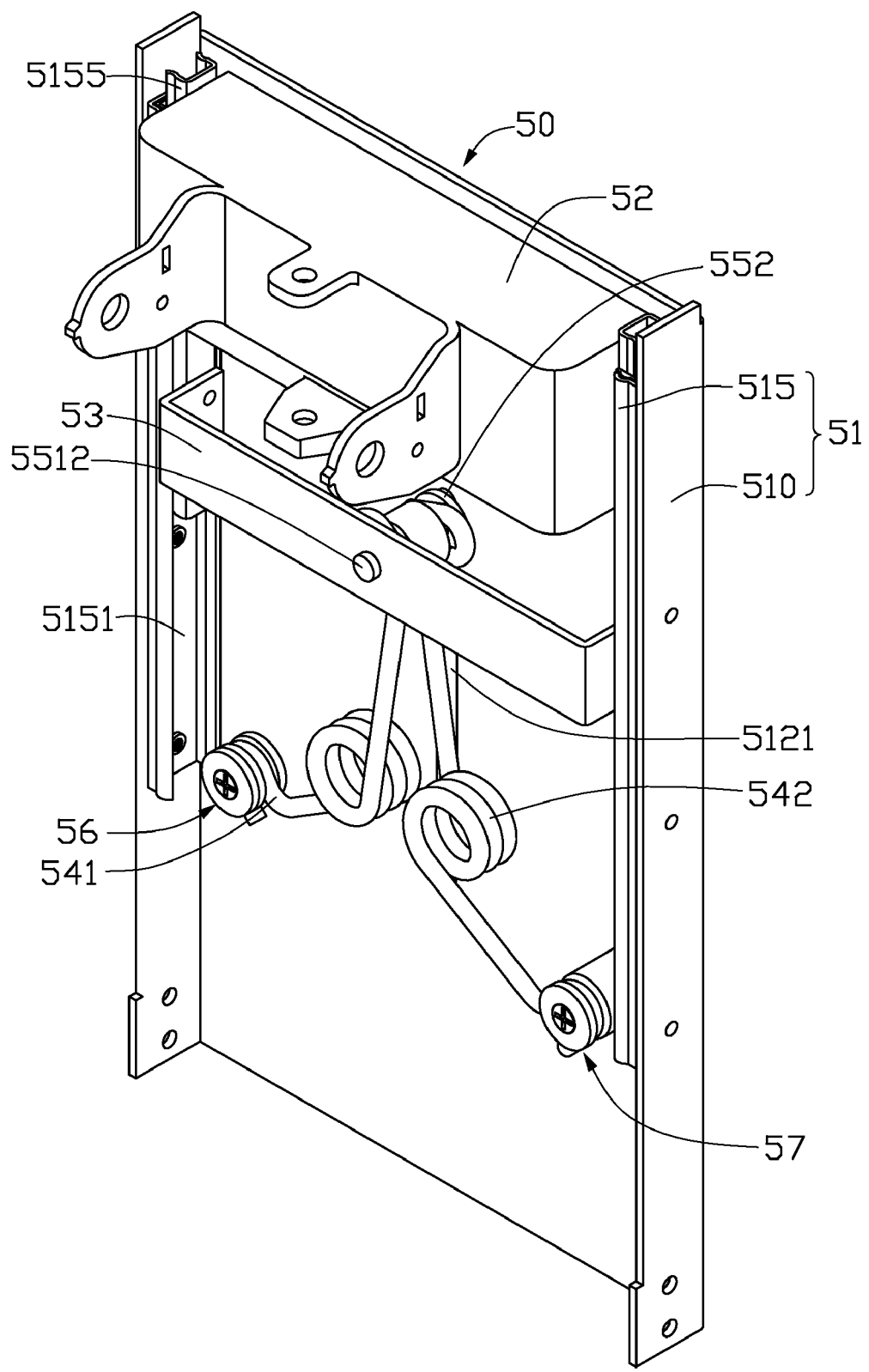
FIG. 2 is an isometric view of the stand of the LCD device of FIG. 1.
Figure 3:
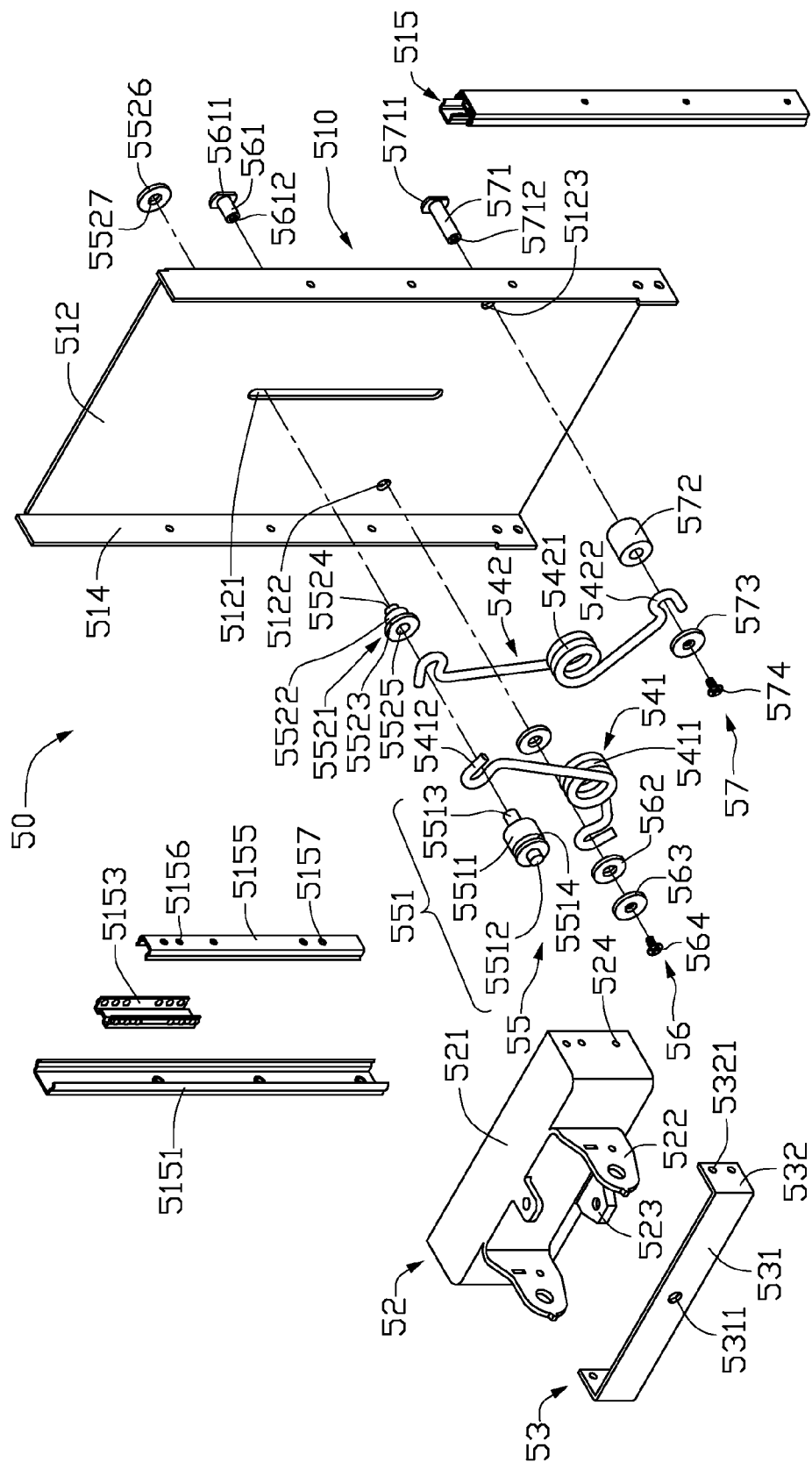
FIG. 3 is an exploded, isometric view of the stand of the LCD device of FIG. 2.
Figure 4:
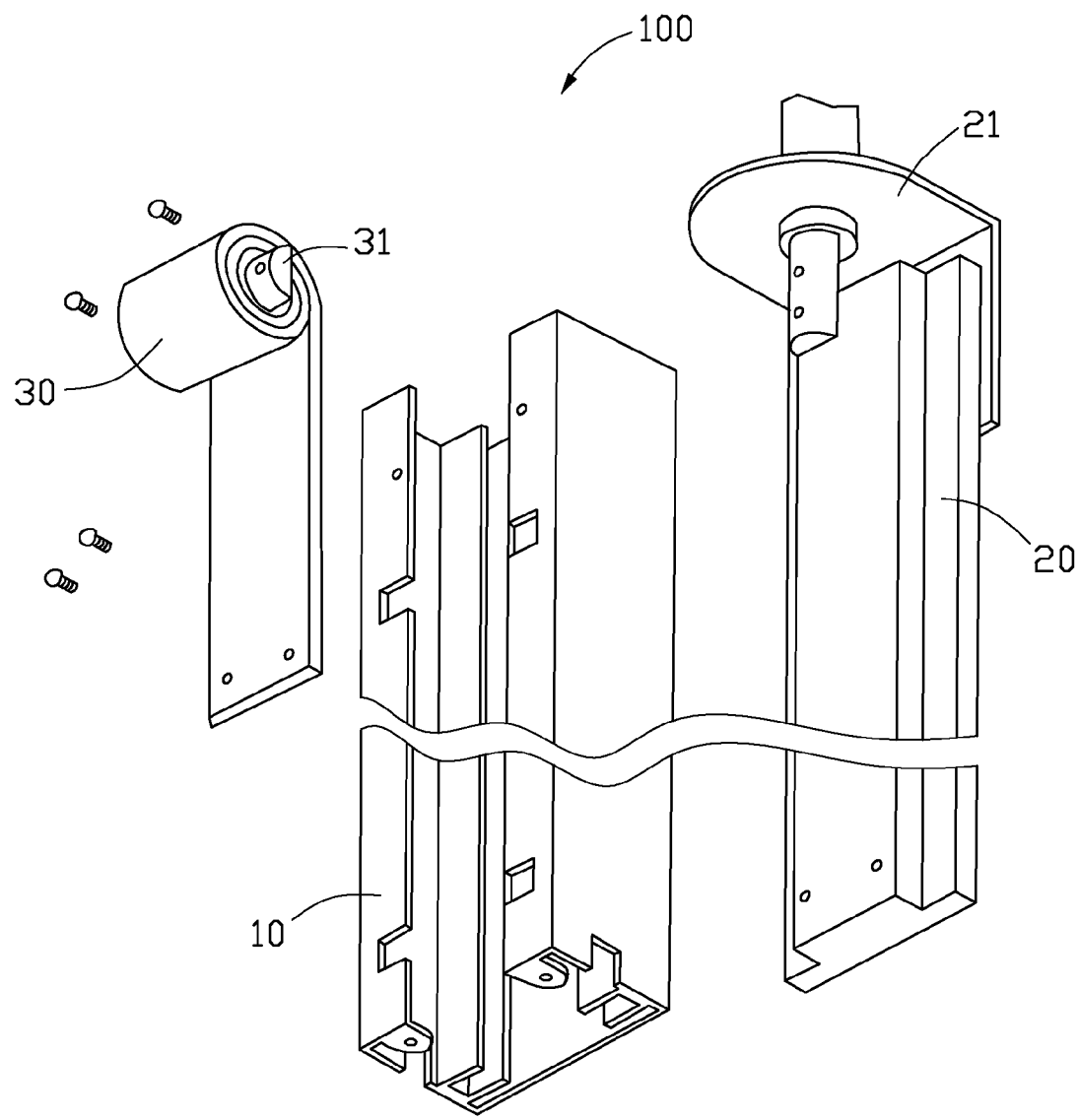
FIG. 4 is an abbreviated, exploded, isometric view of a typical stand.

Referring also to FIGS. 2 and 3, the stand 50 include a frame 51, a sliding member 52, a connecting member 53, a first torsion spring 541, a second torsion spring 542, a first connecting subassembly 55, a second connecting subassembly 56, a third connecting subassembly 57, and a plurality of fastening members (not shown).

The frame 51 includes a housing 510 and two guide rail subassemblies 515. The housing 510 includes a base plate 512 and two side plates 514 extending perpendicularly from opposite sides of the base plate 512. The base plate 512 defines a sliding slot 5121 in a middle portion of the base 512. The base plate 512 defines a first through hole 5122 and a second through hole 5123, both adjacent to a bottom end and opposite sides of the sliding slot 5121. Each guide rail subassembly 515 includes a outer guide rail 5151, an inner guide rail 5155 received in the outer guide rail 5151, and an ball bearing 5153 positioned between the outer guide rail 5151 and the inner guide rail 5155 to reduce a friction force between the outer guide rail 5151 and the inner guide rail 5155. The inner guide rail 5155 defines three fixing holes 5156 in a top end, and two positioning holes 5157 in a bottom end.

The sliding member 52 includes a rectangular hollow main body 521. Two opposing first fixing pieces 522 and two opposing second fixing pieces 523 are formed on a front surface of the main body 521. The first fixing pieces 522 and the second fixing pieces 523 are configured to connect to the LCD panel 41. Each side of the main body 521 defines three fixing holes 524.

The connecting member 53 include a flat plate 531 and two side plates 532 perpendicularly extended from opposite sides of the flat plate 531. A center of the flat plate 531 defines a positioning hole 5311. Each side plate 532 defines two positioning holes 5321.

The first torsion spring 541 includes a coiled portion 5411 and two hooks 5412 extending from opposite ends of the coiled portion 5411. The second torsion spring 542 includes a coiled portion 5421 and two hooks 5422 extending from opposite ends of the coiled portion 5421.

The first connecting subassembly 55 includes a connecting shaft 551 and a wheel 552. The connecting shaft 551 includes a cylindrical main portion 5511, a first tip 5512, and a second tip 5513. The first tip 5512 and the second tip 5513 extend from opposite ends of the main portion 5511. The main portion 551 defines an annular groove 5514 in the side surface. The annular groove 5514 is configured for receiving one of the hooks 5412 of the first torsion spring 541. The wheel 552 is configured to be slidably received in the sliding slot 5121. The wheel 552 includes a roller 5521 and a circular connecting piece 5526 riveted on the roller 5521. The roller 5521 includes a shaft portion 5522, a cap 5523, and a riveting portion 5524. The cap 5523 and the riveting portion 5524 extend from opposite ends of the shaft portion 5522. The roller 5521 defines a receiving hole 5525 therein. A center of the connecting piece 5526 defines a riveting hole 5527 for engaging with the riveting portion 5524 of the roller 5521.

The second connecting subassembly 56 includes a connecting shaft 561, two first washers 562, a second washer 563, and a screw 564. A flange 5611 is formed on one end of the connecting shaft 561. The connecting shaft 561 defines a threaded hole 5612 therein.

The third connecting subassembly 57 includes a connecting shaft 571, a sleeve 572, a washer 573, and a screw 574. A flange 5711 is formed on one end of the connecting shaft 571. The connecting shaft 571 defines a threaded hole 5712 therein.

Referring particularly to FIGS. 1 through 3, in assembly of the stand 50, the guide rail subassemblies 515 are fixed on the side plates 514 of the housing 510. The fastening members extend in the fixing holes 524 of the sliding member 52, and the fixing holes 5156 of the inner guide rail 5155, thus fixing the sliding member 52 to the top end of the inner guide rail 5155, so that the sliding member 52 is slidably positioned on the housing 510. The roller 5521 of the wheel 552 extends in the sliding slot 5121 of the housing 510, and is riveted with the connecting piece 5526. The first tip 5512 of the connecting shaft 551 is inserted into the positioning hole 5311 of the connecting member 53. The fastening members extend through the positioning holes 5321 of the connecting member 53, and the positioning holes 5157 of the inner guide rail 5155, thus fixing the connecting member 53 to the bottom end of the inner guide rail 5155. One of the hooks 5412 of the first torsion spring 541 is hooked onto the annular groove 5514 of the connecting shaft 551. One of the hooks 5422 of the second torsion spring 542 sleeves on the second tip 5513 of the connecting shaft 551. The screw 564 is inserted through the second washer 563, one of the first washers 562, the other hook 5412 of the first torsion spring 541, the other first washer 562, the first through hole 5122 of the housing 510, and screwed into the threaded hole 5612 of the connecting shaft 561. The screw 574 is inserted through the washer 573, the other hook 5422 of the second torsion spring 542, the sleeve 572, the second through hole 5123 of the housing 510, and screwed into the threaded hole 5712 of the connecting shaft 571.

After the stand 50 is assembled, the first torsion spring 541 and the second torsion spring 542 are substantially parallel to the base plate 512. The sliding member 52, the connecting member 53, and the inner guide rail 5155 are movable along the outer guide rail 5151 relative the housing 510. The first connecting subassembly 55 is slidable along the sliding slot 5121. Therefore, the first torsion spring 541 and the second torsion spring 542 are deformable to produce an elastic force.

Referring to FIGS. 1 through 4, in use, the sliding member 52 can be driven to slide in the housing 510 by an external force. At the same time, the elastic force is produced by the first torsion spring 542 and the second torsion spring 542 due to a deformation of the first torsion spring 541 and the second torsion spring 542. When the external force is removed, the LCD panel 41 connected to the sliding member 52 will remain in a desired position, because a total weight of the LCD panel 41, the sliding member 52, and the connecting member 53 is equal to a total force of the elastic force produced by the first torsion spring 541 and the second torsion spring 542 and a friction force between the outer guide rail 5151 and inner guide rail 5155.

Since torsion springs are more durable than coiled springs, the stand 50 will have a long service life. Moments of the first torsion spring 542 or the second torsion spring 542 may be changed, for example, by changing a length of the hooks 5412 of the first torsion spring 541 or the hooks 5422 of the second torsion spring 542. Therefore, the stand 50 can carry the LCD panel 41 with different weight. In addition, the first torsion spring 541 and the second torsion spring 542 are substantially perpendicular to the base plate 512, so that the stand may have a small thickness.

In one embodiment, the stand 50 may include a single torsion spring. Ends of the torsion spring are connected to the connecting member 53 and the housing 51 respectively. In another embodiment, the stand 50 may not include the connecting member 53, and the first torsion spring 541 and the second torsion spring 542 are connected directly to the sliding member 52. In yet another embodiment, the stand 50 may only have a single guide rail subassembly, and the sliding member 52 is positioned on the guide rail subassembly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A stand comprising:
   a frame comprising at least one guide rail subassembly;
   a sliding member slidably attached to the at least one guide rail subassembly;
   at least one torsion spring, wherein a first end of the at least one torsion spring is connected to the frame, and a second end of the at least one torsion spring is connected to the sliding member, to provide an elastic force to overcome the total weight of the sliding member and a load mounted on the sliding member; and
   a first connecting subassembly connecting the at least one torsion spring to the sliding member, wherein the first connecting subassembly comprises a wheel; a sliding slot is defined in the frame; the wheel is slidably positioned in the sliding slot.

2. The stand of claim 1, wherein the frame farther comprises a housing, the housing comprises a base plate, the at least one torsion spring is substantially parallel to the base plate.

3. The stand of claim 2, wherein the housing farther comprises two side plates extending perpendicularly from opposite sides of the base plate, the at least one guide rail subassembly is at least two guide rail subassemblies fixed to the side plates.

4. The stand of claim 1, wherein the at least one guide rail subassembly comprises an outer guide rail connected to the frame, an inner guide rail connected to the sliding member, and a ball bearing positioned between the outer guide rail and the inner guide rail.

5. The stand of claim 4, further comprising a connecting member, ends of the connecting member are connected to the inner guide rail of each of the at least one guide rail subassembly, and the first connecting subassembly connects the connecting member.

6. The stand of claim 1, wherein the first connecting subassembly further comprises a connecting shaft, the connecting shaft comprises a main portion, a first tip, and a second tip; the first tip and the second tip are extended from opposite ends of the main portion; the first tip is fixed to the connecting member; the second tip is fixed to the wheel.

7. The stand of claim 4, wherein the number of the at least one torsion spring is two, the two torsion springs comprises a first torsion spring and a second torsion spring.

8. The stand of claim 7, further comprising a second connecting subassembly and a third connecting subassembly, the second connecting subassembly connects an end of the first torsion spring to the frame, and the third connecting subassembly connects an end of the second torsion spring to the frame.

9. The stand of claim 8, wherein the third connecting subassembly comprises a connecting shaft and a sleeve, the connecting shaft fixes the end of the second torsion spring to the frame, the sleeve is sleeved on the connecting shaft, and positioned between the second torsion spring and the frame.

10. The stand of claim 1, wherein the at least one torsion spring comprises a coiled portion and two hooks extending from opposite ends of the coiled portion.

11. A display device comprising:
a liquid crystal display panel;
a stand for supporting the liquid crystal display panel, the stand comprising:
a frame comprising at least one guide rail subassembly;
a sliding member slidably attached to the at least one guide rail subassembly, and connected to the liquid crystal display panel;
at least one torsion spring, wherein a first end of the at least one torsion spring is connected to the frame, and a second end of the at least one torsion spring is connected to the sliding member, to provide an elastic force to overcome the total weight of the sliding member and the liquid crystal display panel; and
a first connecting subassembly connecting the at least one torsion spring to the sliding member, wherein the first connecting subassembly comprises a wheel; a sliding slot is defined in the frame; the wheel is slidably positioned in the sliding slot.

12. The display device of claim 11, wherein the frame further comprises a housing, the housing comprises a base plate, the at least one torsion spring is substantially parallel to the base plate.

13. The display device of claim 12, wherein the housing further comprises two side plates extending perpendicularly from opposite sides of the base plate, the at least one guide rail subassembly is at least two guide rail subassemblies fixed to the side plates.

14. The display device of claim 11, wherein the at least one guide rail subassembly comprises an outer guide rail connected to the frame, an inner guide rail connected to the sliding member, and a ball bearing positioned between the outer guide rail and the inner guide rail.

15. The display device of claim 14, wherein the stand further comprises a connecting member, ends of the connecting member are connected to the inner guide rail of each of the at least one guide rail subassembly, and the first connecting subassembly connects the connecting member.

16. The display device of claim 11, wherein the at least one torsion spring comprises a coiled portion and two hooks extending from opposite ends of the coiled portion.

* * * * *